US007226290B2

(12) United States Patent
Nickol

(10) Patent No.: US 7,226,290 B2
(45) Date of Patent: Jun. 5, 2007

(54) PORTABLE AESTHETIC COMPONENT COMPARISON SYSTEM, DECORATOR DESIGN TOOL, RETAINING STUD, AND METHOD

(76) Inventor: Mary Nickol, 3421 Angie Cir., Coeur d'Alene, ID (US) 83815

( * ) Notice: Subject to any disclaimer, the term of this patent is extended or adjusted under 35 U.S.C. 154(b) by 115 days.

(21) Appl. No.: 10/841,315

(22) Filed: May 7, 2004

(65) Prior Publication Data

US 2005/0260546 A1 Nov. 24, 2005

Related U.S. Application Data

(60) Provisional application No. 60/565,599, filed on Apr. 26, 2004.

(51) Int. Cl.
*G09B 19/00* (2006.01)
*A47F 7/16* (2006.01)
*B65D 73/00* (2006.01)

(52) U.S. Cl. ........................... 434/95; 434/81; 434/98; 211/45; 211/61; 206/388; 206/493

(58) Field of Classification Search ................ 446/129, 446/130, 131, 132, 133, 134, 135, 136, 137, 446/138; 206/81, 472, 473, 474, 475, 388; 40/711, 426; 434/95, 395, 81, 400, 98, 99; 211/61, 163, 45–47, 58, 87.01, 86.01
See application file for complete search history.

(56) References Cited

U.S. PATENT DOCUMENTS

| | | | | | |
|---|---|---|---|---|---|
| 305,381 | A | * | 9/1884 | Forsaith | 242/594.1 |
| 328,283 | A | | 10/1885 | Brinkerhoff | |
| 792,563 | A | * | 6/1905 | Turner | 206/388 |
| 1,197,610 | A | * | 9/1916 | Darling | 190/16 |
| 2,270,331 | A | * | 1/1942 | Ross | 335/285 |
| 2,495,054 | A | | 1/1950 | Cooper | |
| 2,558,386 | A | | 6/1951 | Rabinowitz | |
| 2,595,837 | A | * | 5/1952 | Freeman | 211/10 |
| 3,000,113 | A | * | 9/1961 | Olson | 434/98 |
| 3,153,177 | A | * | 10/1964 | McFadyen | 335/285 |
| 3,258,237 | A | * | 6/1966 | Beiman | 248/220.31 |
| 3,318,279 | A | * | 5/1967 | Padilla | 116/63 R |
| 3,759,398 | A | * | 9/1973 | Romney | 211/46 |
| 3,978,594 | A | * | 9/1976 | Pulitzer et al. | 434/99 |
| 4,042,247 | A | * | 8/1977 | Harrington | 273/141 A |
| 4,172,521 | A | * | 10/1979 | Eubanks et al. | 206/388 |
| 4,193,198 | A | * | 3/1980 | Bauer | 433/77 |
| 4,377,232 | A | | 3/1983 | Reiss | |
| 4,420,270 | A | * | 12/1983 | Rossello | 402/76 |
| 4,585,197 | A | | 4/1986 | Liautaud et al. | |
| 4,836,783 | A | | 6/1989 | Harper | |
| 4,865,285 | A | | 9/1989 | Gaggianese | |
| 5,052,563 | A | * | 10/1991 | Camp | 211/85.2 |
| 5,096,154 | A | | 3/1992 | Ellis | |

(Continued)

*Primary Examiner*—Dmitry Suhol
(74) *Attorney, Agent, or Firm*—Wells St. John P.S.

(57) ABSTRACT

A portable aesthetic component comparison system is provided with a support base, a work surface, a post, and a plurality of carriers. The work surface is provided on the support base. The post is supported by the support base centrally of the work surface. The plurality of carriers are each configured to support at least one aesthetic component, each carrier having an aperture configured to be received over the post for pivotal positioning of one aesthetic component relative to another aesthetic component atop the work surface. A method is also provided.

16 Claims, 6 Drawing Sheets

U.S. PATENT DOCUMENTS 5,182,616 A * 1/1993 Roberts et al. ............. 356/402
5,609,484 A * 3/1997 Hawiuk ....................... 434/94
5,743,407 A 4/1998 Williams
6,012,594 A * 1/2000 Heinz .......................... 211/46
2002/0045150 A1 4/2002 Mosley

* cited by examiner

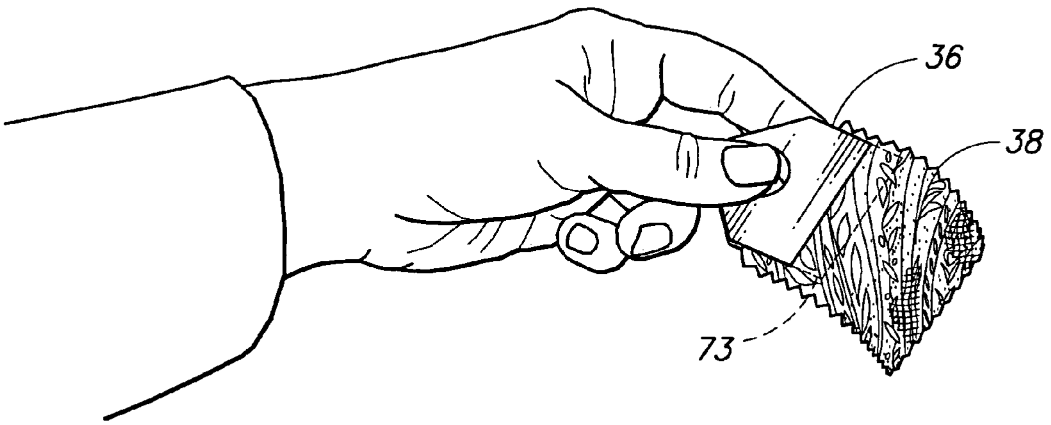
Fig 5
Fig 6
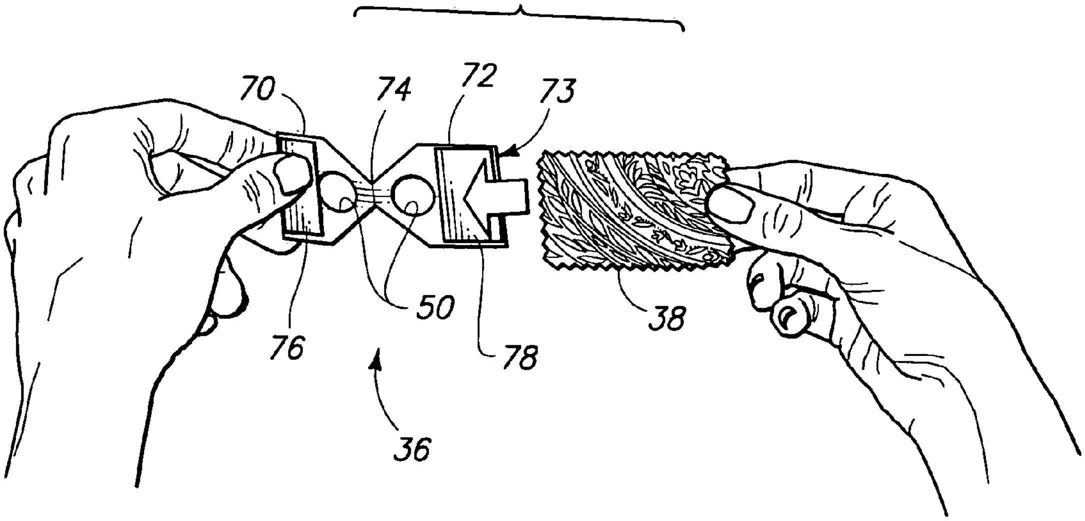

PORTABLE AESTHETIC COMPONENT COMPARISON SYSTEM, DECORATOR DESIGN TOOL, RETAINING STUD, AND METHOD

CROSS-REFERENCE TO RELATED APPLICATION

This application claims priority in U.S. Provisional Patent Application Ser. No. 60/565,599 entitled "Portable Aesthetic Component Comparison System, Decorator Design Tool, Retaining Stud, and Method", naming as inventor Mary Nickol, which was filed on Apr. 26, 2004, and which is incorporated by reference herein.

TECHNICAL FIELD

This invention pertains to design and manipulation of aesthetic components. More particularly, the present invention relates to systems and methods for facilitating the comparison of aesthetic components, such as comparing colors and textures in fabric swatches with thread or yarn samples.

BACKGROUND OF THE INVENTION

Aesthetic design of textile and printed goods encompasses interior decorating and fashion design. In many cases, experts are engaged by customers to render design and decorating services. This often involves reviewing and comparing many material samples in order to decide on a combination of materials that presents an aesthetically pleasing design for a customer. For example, an interior decorator may be tasked with creating a rug that matches a particular fabric design on an existing couch or draperies. In order to do this, the interior decorator can be faced with a daunting task, as thread is typically stored on a large bobbin and a decorator may need to collect many bobbins in order to compare color and texture for each thread with a fabric swatch. This problem is further compounded when the decorator has to travel to a customer location in order to perform such a comparison. Furthermore, the task of visualizing threads, yarns, and textile fabrics to determine complementary elements and how they blend together can be difficult.

Attempts have been made to lay out and compare material samples, such as thread and fabric, when performing decorating and design services. For example, U.S. Pat. No. 2,495,054 to Cooper, entitled "Means for Use in the Designing of Woven Fabrics", and issued Jan. 17, 1950, provides several groups of colored (or thread and fabric covered) blocks that are manipulated into design configurations in order to visualize how the different colors blend together in a proposed design. However, these blocks prove bulky, and the total number of samples capable of being used in a compact and portable system is severely limited.

U.S. Pat. No. 5,743,407 to Williams, entitled "Color Reference System for Decorators", and issued. Apr. 28, 1998, provides a color reference system for correlating colors to decorating parameters for an area. Color reference cards are used to store color samples. An associated identifier is used to correlate the color sample to the identifier. Decorating parameters are provided on area reference cards for different rooms and locations, such as primary, accent, and accessory color identifiers. For the case where a color sample corresponds to a decorating parameter for a location, the identifier is recorded in association with the decorating parameter. The entire system is portable, and a user can find a color sample for comparison purposes without carrying color palettes with color samples that don't correspond to colors in an area to be decorated by looking at a decorating parameter for an area and using the color identifier to find the color sample on the color reference card. However, a user is not armed with a broad range of color samples. Secondly, the system does not provide a convenient display area for comparing color samples, while retaining the color samples within a defined work area.

Attempts have been made to consolidate material samples, such as thread and fabric, when performing decorating and design services. For example, published U.S. Patent Application No. 2002/0045150 A1 to Mosley, entitled "Method for Organizing Threads", and published on Apr. 18, 2002, is directed to a method for organizing threads. I-shaped elements are loaded with thread samples, each with a unique color. The elements can be loaded into a storage unit for later use. A color comparison chart is used to compare various colors of threads between compatible color code schemes. However, the storage unit has multiple levels, and is not very compact and portable. Secondly, there is little aid provided when it comes time to visually compare colors of thread, as a comparison chart is used instead of presenting a visual display for performing a comparison.

SUMMARY OF THE INVENTION

A design tool is provided for facilitating fabric and/or yarn layout to assist a user in matching specific colors of thread or yarn to other threads or yarns, or to respective design components such as samples of fabric. In addition, this concept can be used to display and manipulate paint samples; laminates and surfacing materials, such as Formica®; wood samples; wallpaper; wall borders; photographs; or stone samples when a decorator is performing design services for a customer. For example, the design tool is suited for use by interior decorators and fashion designers.

According to one aspect, a portable aesthetic component comparison system is provided with a support base, a work surface, a post, and a plurality of carriers. The work surface is provided on the support base. The post is supported by the support base centrally of the work surface. The plurality of carriers are each configured to support at least one aesthetic component, each carrier having an aperture configured to be received over the post for pivotal positioning of one aesthetic component relative to another aesthetic component atop the work surface.

According to another aspect, a decorator design tool is provided having a base and a post. The base provides a working surface. The post is supported by the base centrally of the work surface. The post is configured to receive a plurality of aesthetic components each supported via a carrier with a hole configured to be received over the post for pivotal positioning of one aesthetic component relative to another aesthetic component atop the work surface.

According to yet another aspect, a stud is provided for retaining and manipulating design components when rendering aesthetic design decisions including a base and a post affixed to the base and having a magnet configured to facilitate retention of design components via a magnetizable carrier about the post.

According to even another aspect, a method is provided for comparing aesthetic design components. The method includes: providing a post mounted centrally of and extending from a base having a work area thereabout; receiving a first aesthetic component on a carrier via an aperture about the post for presentment over the work area; presenting a second aesthetic component on a carrier via an aperture about the post for presentment over the work area; and pivotally positioning the first aesthetic component relative to the second aesthetic component about the post and over the work area to facilitate visual perception of complementary characteristics between the first aesthetic component and the second aesthetic component.

BRIEF DESCRIPTION OF THE DRAWINGS

Preferred embodiments of the invention are described below with reference to the following accompanying drawings.

FIG. 5 is a perspective view of a fabric carrier retaining a selected fabric swatch for use in a decorator design tool of the present invention.

FIG. 6 is a perspective view illustrating mounting of a fabric swatch into the fabric carrier of FIG. 5.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Reference will now be made to a preferred embodiment of Applicant's invention. A design component comparison system and method is provided for assisting a designer with organizing and comparing aesthetic design components, such as fabric swatches, threads, yarns, and material specimens, including beads, charms, ornaments, and embellishments. While the invention is described by way of two embodiments, it is understood that the description is not intended to limit the invention to such embodiments, but is intended to cover alternatives, equivalents, and modifications which may be broader than the embodiments, but which are included within'the scope of the appended claims.

Figure 1:
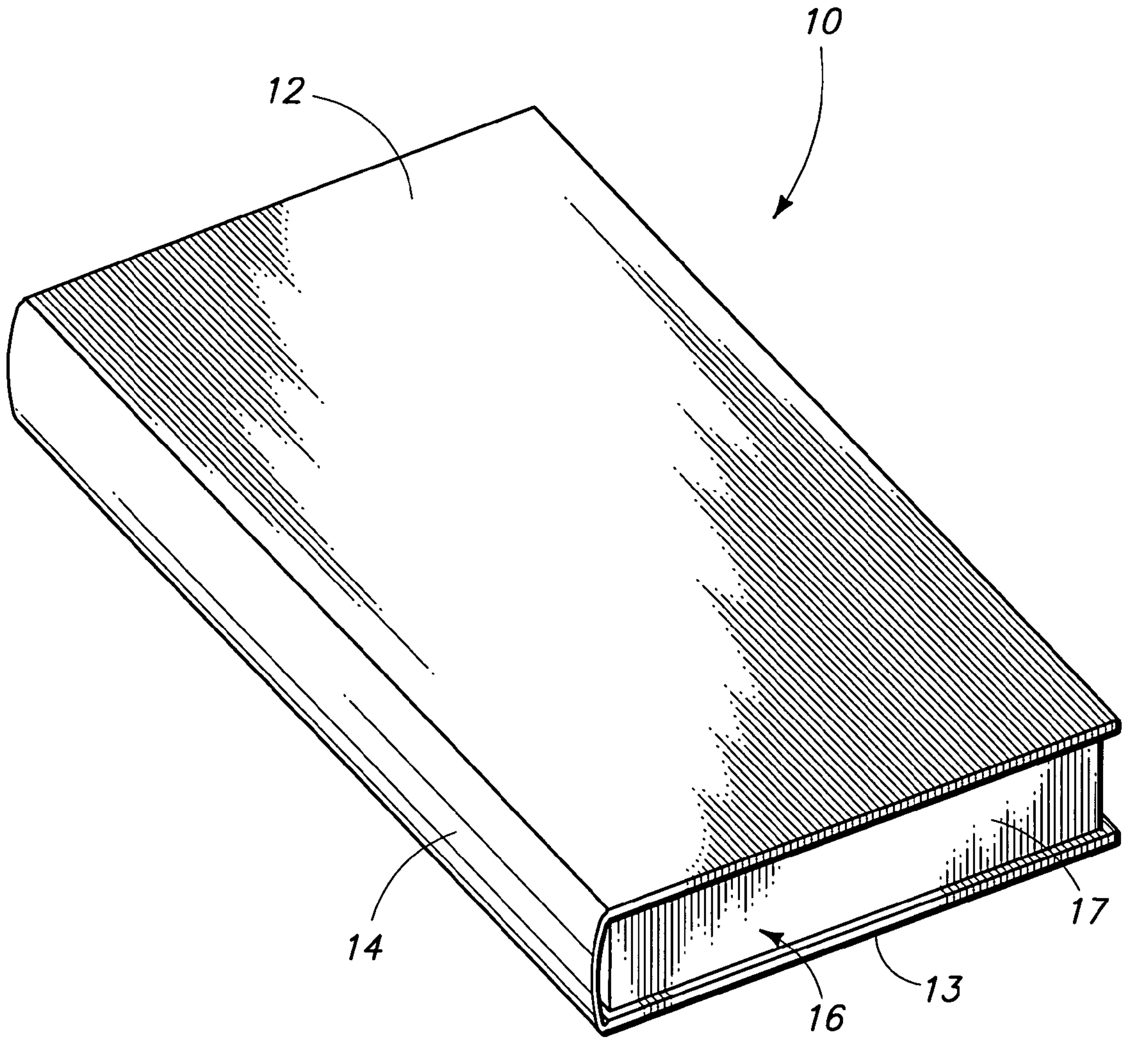
FIG. 1 is a perspective view of a folio incorporating features of the present invention with the folio in a closed condition.
Figure 2:
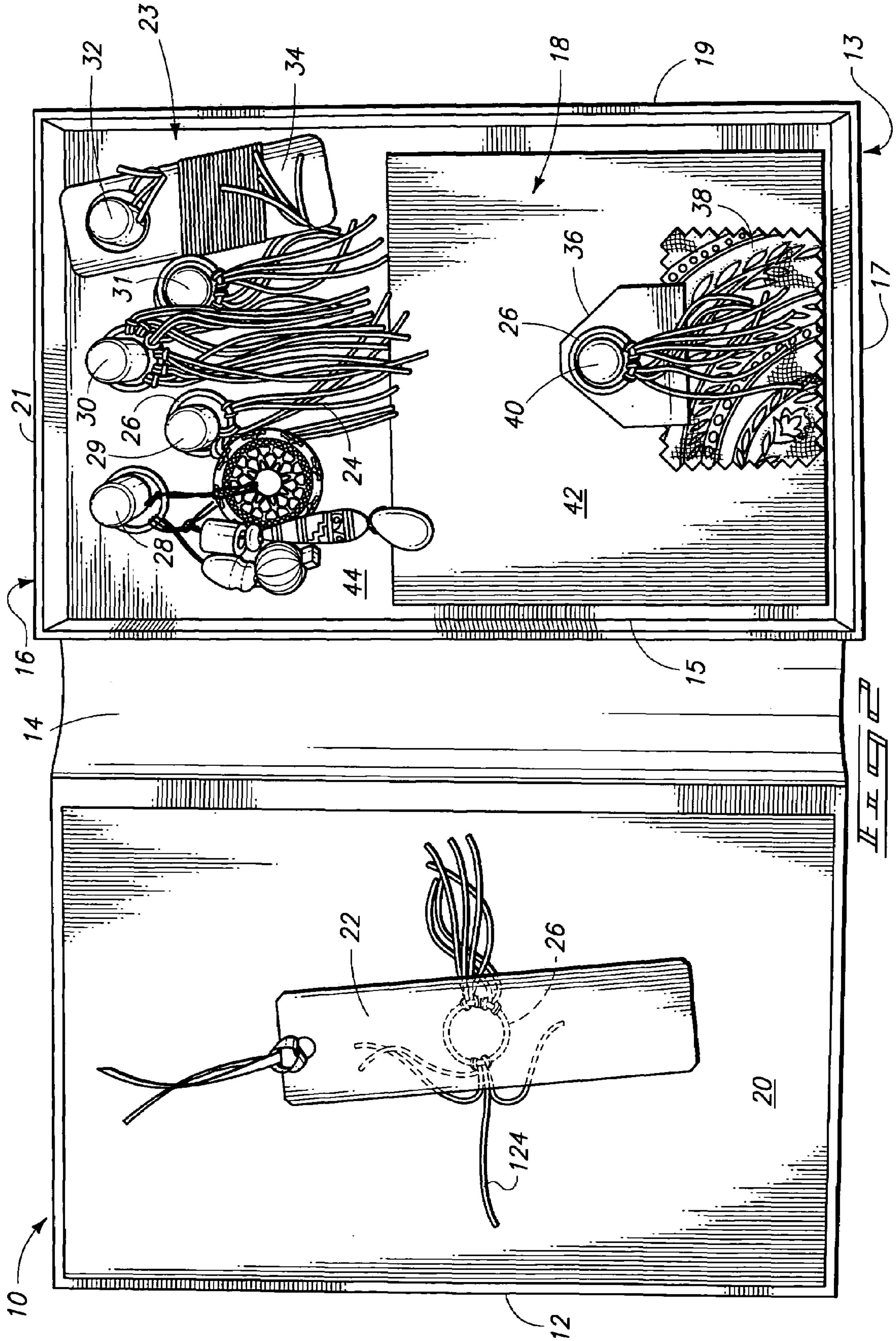
FIG. 2 is a perspective view taken from above of the folio of FIG. 1 with the folio in an opened condition.

As shown in FIGS. 1–4, a folio 10 is provided with an appearance and a size similar to that of a hard-cover textbook. As shown in FIG. 2, folio 10 has a front cover 12 that opens via a hinge 14 to unveil a walled portion 16 in which a work area 18 is provided. Hinge 14 is provided between front cover 12 and a back cover 13. According to one construction, hinge 14 is made from a reinforced cloth material. Walled portion 16 is configured in the shape of a rectangle and includes sidewalls 15, 17, 19 and 21 (see FIG. 2).

FIG. 2 illustrates folio 10 in an opened position with front cover 12 completely open via hinge 14 in relation to back cover 13. An inner surface of front cover 12 is covered with a metal sheet 20 having a white outer surface such as white powder-coated sheet steel. Alternatively, sheet 20 can be formed from a sheet of magnetic material. Metal sheet 20 is magnetized when placed into contact with a permanent magnet. Metal sheet 20 is adhesively mounted onto an inner surface of front cover 12. A flexible sheet of permanent magnetic material is used to form a rectangular-shaped magnetic retainer 22 that is magnetically affixed and released relative to metal sheet 20. Magnetic retainer 22 comprises a flexible magnetic sheet of material that can be easily separated from sheet 20 by way of an attached ribbon or pull tag. A designer may place one or more selected fibers, such as fiber 124, onto a ring-shaped carrier 26 onto sheet 20, after which magnetic retainer 22 is used to secure ring carrier 26 therebetween, with separated fiber 124 being stored away from other fibers for later identification. In this manner, it is understood that multiple selected fibers can be stored along with multiple ring carriers via the magnetic retainer. Such feature is particularly desirable when a designer is part way through a design process and has identified a preferred fiber, such as fiber 124, that matches a color scheme or texture of another fiber or pattern within a fabric swatch.

The magnetic attraction between magnetic retainer 22 and metal sheet 20 provides a removable means for retaining ring carrier 26 and fiber 124 for later identification and retrieval. In this manner, one or more fibers and their respective carrier(s) can be mounted between retainer 22 and sheet 20, particularly after a designer has identified specific fibers that are going to be used in a specific combination for a design project, such as in the weaving of a desired rug.

Retainer 22 can also be utilized to retain other selected aesthetic components, such as swatches of fabric, beads, trinkets or charms. Even furthermore, it is envisioned that retainer 22 could be used to magnetically retain samples of countertop material, such as Formica®, or natural materials, such as stone. Even furthermore, retainer 22 could be used to secure samples of paint chips, samples of blinds, or any other decorative items used by a designer in designing or decorating an interior space, such as a room within a house, or for a weaving or craft project.

As shown in FIG. 2, metal sheet 20 also serves a second function. Namely, a plurality of magnetic studs (or posts) 28–32 and 40, are mounted securely onto a base 44 that is provided within walled portion 16 and atop an inner surface of back cover 13. Each stud 28–32 and 40 has an enlarged, or mushroom-shaped magnetic (or magnetized) head, in which a magnetized component is embedded near the top of the head. Accordingly, each stud 28–32 and 40 cooperates magnetically to attract metal sheet 20 on the inner surface of front cover 12, thereby forming a latch that holds cover 12 closed against studs 28–32 and 40. The tops of studs 28–32 and 40 are provided substantially flush in planar relation relative to a top edge of walled portion 16. Accordingly, engagement of sheet 20 with the top of studs 28–32 and 40 presents an inside surface of cover 12 in closed relation atop walled portion 16, thereby closing folio 10. In order to open cover 12, a user needs to merely grasp an outer edge of cover 12 and apply sufficient force to separate sheet 20 from magnetic affixation with the top of studs 28–32 and 40.

As shown in FIG. 2, studs 28–32 and 40 are all provided within a display area that is defined within walled portion 16. The display area includes a work area 18. Studs 28–32 are provided within storage area 23, whereas a display stud 40 is provided within work area 18. The region atop a display background 42 defines work area (or surface) 18. Studs 28–32 provide storage studs onto which aesthetic components are stored by way of an aperture or a hole that-is provided within a carrier for the aesthetic components. More particularly, one type of aesthetic component comprises fibers or yarns 24 which are carried individually or in groups by a fiber carrier 26 comprising a metal ring, such as a magnetizable steel ring. For example, fibers can be grouped together by weight or fiber content, and mounted accordingly onto a common ring-shaped fiber carrier. Other aesthetic components comprise strings of beads 33 and 35, a fiber test board 34, a decorative charm or medallion 37, and a cloth sample 38 provided on a cloth carrier 36 (see FIG. 3).

As shown in FIG. 2, display stud 40 is disposed from studs 28–32 within storage area 23 so that display stud 40 is provided centrally within a work area 18. A user selects aesthetic components that are stored on studs 28–32 where they are then placed onto stud 40 for manipulation and display over a display background 42 within work area 18.

As shown in FIG. 2, a fiber swatch (or sample) 38 is magnetically affixed within a cardboard fiber carrier 36 that has an aperture sized to be received over stud 40. Further details of carrier 36 are provided below with reference to FIGS. 5 and 6. Subsequently, the metal ring of carrier 26, with fibers stored thereon, is then received over stud 40. Magnetic attraction between the topmost portion of stud 40 and the metal ring of fiber carrier 26 prevents dislodgment of carrier 26. Carrier 36 is also magnetically attracted to stud 40, as well as display background 42, which helps retain the accompanying yarns 24 and swatch of fabric 38, respectively, onto stud 40. Furthermore, magnetic attraction between carrier 26 and stud 40 assists in holding carrier 36 onto stud 40.

Accordingly, stud 40 enables a designer to implement comparison of design choices between different aesthetic components by selecting components that are stored on studs 28–32 in storage area 23 for removal and display within work area 18 by securing such aesthetic components onto stud 40 for display atop display background 42. According to one construction, display background 42 comprises a sheet of magnetic material (without any adhesive) having a first face that is white and a second face that is black. Sheet 42 magnetically affixes to base 44. In this manner, sheet 42 can be reversed to present either the white face or the black face as a top face which is viewed by a designer. Accordingly, the designer can change the background color used about stud 40 between black, white, or any other color. In order to accomplish such achievement, sheet 42 has a central hole or aperture sized to be received over stud 40. Furthermore, base 44 comprises an adhesive-backed sheet of magnetic material which is adhesively bonded within walled portion 16 to a base support structure provided thereunder. According to one construction, base 44 includes a sheet of magnetic material that has a black top surface.

As shown in FIG. 2, magnetizable metal sheet (i.e., 30 gauge galvanized sheet metal) 20, is formed from a sheet of steel, whereas base 44 and display background 42 are each formed from a sheet of magnetic material. The exposed face on metal sheet 20, according to one construction, is white powder-coated paint. The exposed face on base 44 is black. Display background 42, according to one construction, has a black face and a white face with a central aperture sized to receive stud 40 in clearance therethrough. By merely reversing the sides on display background 42 and magnetically demating display background 42 from base 44, display background 42 can be reversed in order to change the display background color. According to one construction, display background 42 comprises a white face and an opposite black face.

According to one construction, magnetic sheet material can be used for retainer 22, base 44, and background 42 which is commercially available from Magically Magnetic, Inc. of Saxonburg, Pa. One suitable thickness is a 45-mil self-adhesive magnetic backing that is approximately $\frac{1}{16}^{th}$ of an inch in thickness. In one form the magnetic backing is self-adhesive, which is suitable for constructing the magnetic sheet of base 44. The magnetic sheet used to provide display background 42 and retainer 22 is similarly constructed, but does not have a self-adhesive backing provided thereon. It is understood that other types of magnetic sheet material can be utilized. For example, 15-mil thick self-adhesive (or non-adhesive) magnetic sheet can also be utilized.

Figure 3:
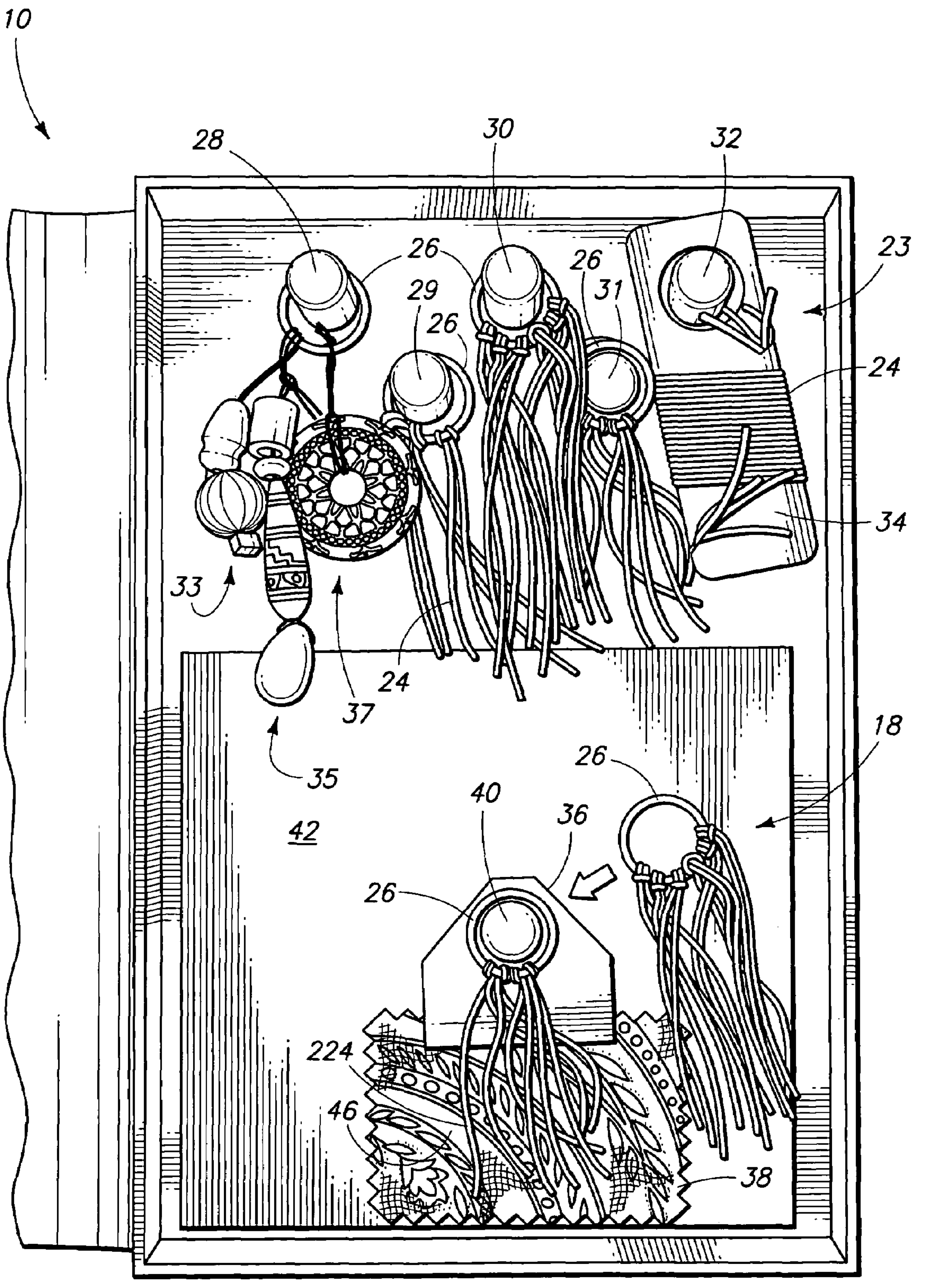
FIG. 3 is an enlarged partial perspective view taken from above the folio of FIG. 2 with the folio in an opened condition.

As shown in enlarged detail in FIG. 3, the provision of an enlarged mushroom-shaped head on display stud 40 (as well as studs 28–32) facilitates retention of metal ring fiber carriers 26 when displaying and manipulating threads or yarns 24 for viewing in relation to one another, or for viewing to compare colors in a fabric swatch 38. Fabric swatch 38 can be pivoted or rotated about cylindrical stud (or post) 40. Similarly, yarns 24 can be pivoted via ring 26 about stud 40 in order to manipulate a specific thread or yarn for visual placement adjacent or atop a selected colored portion of fabric swatch 38. Additionally, selected yarns can be slid around ring 26 to separate a selected yarn from other yarns on ring 26. For example, a specific olive green colored fiber 224 can be selected and separated from the remaining fibers on carrier 26 for placement atop or adjacent the color component 46 within fabric swatch 38 that also has an olive green color. Accordingly, the designer can compare the color and texture of fiber 224 and color element 46 in order to determine whether a complementary color configuration has been realized therebetween. Hence, a user of folio 10 can easily manipulate aesthetic components such as fibers and fabric samples in order to realize such complementary color configurations when designing a project.

In operation, storage area 23 includes a plurality of magnetic studs 28–32 onto which fiber carriers 26 are retained. More particularly, fiber carrier 26 comprises a cylindrical ring of metal material (such as steel) that is magnetically attracted to a topmost magnetized (or magnetic) portion on each of studs 28–32 and 40.

As shown in FIG. 3, fiber test board 34 can also be carried about any of studs 28–32, as well as stud 40. Fiber test board 34 is used to arrange several fibers 24 in side-by-side relation for a comparative color analysis by winding such fibers 24 adjacent to one another about board 34, for example, to judge proportion and stripe sequence. Typically, fiber test board 34 is made from wood or plastic. As shown in FIG. 3, fiber test board 34 includes four selected and differently colored fibers 24 which are wound adjacent to one another about fiber test board 34 to compare complementary color matches.

As shown in FIG. 3, fabric (or cloth) carrier 36 can be used to store fabric swatch 38 atop any one of studs 28–32, within storage area 23. Fabric carrier 36 magnetically clamps onto opposite sides of a sample of fabric, or fabric swatch, 38 as taken from a selected design or fabric. Alternatively, fabric swatch 38 can be adhesively affixed onto a cardboard or plastic carrier. By separating display 40 from studs 28–32, a designer can focus their design comparative analysis within work area 18 by mounting aesthetic components for support about stud 40. Hence, folio 10 can be used to store fiber or fabric samples at a first location (studs 28–32) and manipulate such fiber and fabric samples at a second location (stud 40), disposed from the first location, in order to facilitate color coordination between the fibers and a background, such as a fabric swatch.

As shown in FIG. 3, a desired fabric sample 38 is placed onto display background 42 by placing cloth carrier 36 around stud 40. Subsequently, an individual who is designing a woven product, such as a rug, can select individual fabric carriers 26 and accompanying fiber samples 24 from studs 28–32 for placement onto stud 40 where they are retained by magnetic attraction. A designer can then select an individual fiber 24 (or multiple fibers) for placement atop or adjacent to fabric 38 to identify complementary color configurations for individual fibers that might complement colors within fabric sample 38.

For example, a designer may be given the task of designing a rug that matches a specific fabric covering for a sofa or for draperies that will be used to cover windows within a room. A designer can then place a fabric swatch in a work area (such as work area 18 of FIG. 3) and compare it with a multitude of fibers that would be used to construct a rug that complements color elements (such as color element 46 of FIG. 3) within the fabric swatch.

Because stud 40 and carrier 26 are both cylindrical, a plurality of fiber carriers 26 can be pivotally, as well as rotatably, positioned about stud 40 such that one or more selected fibers can be placed downwardly over cloth 38 while other fibers are placed away from cloth 38 to facilitate visual viewing of complementary color configurations. The ability to pivot or rotate and position selected fibers 24 atop fabric swatch 38 enables a fabric designer to manipulate and view color matches when selecting fibers used to prepare the manufacture of a woven article, or rug, that will complement color swatch 38.

Figure 4:
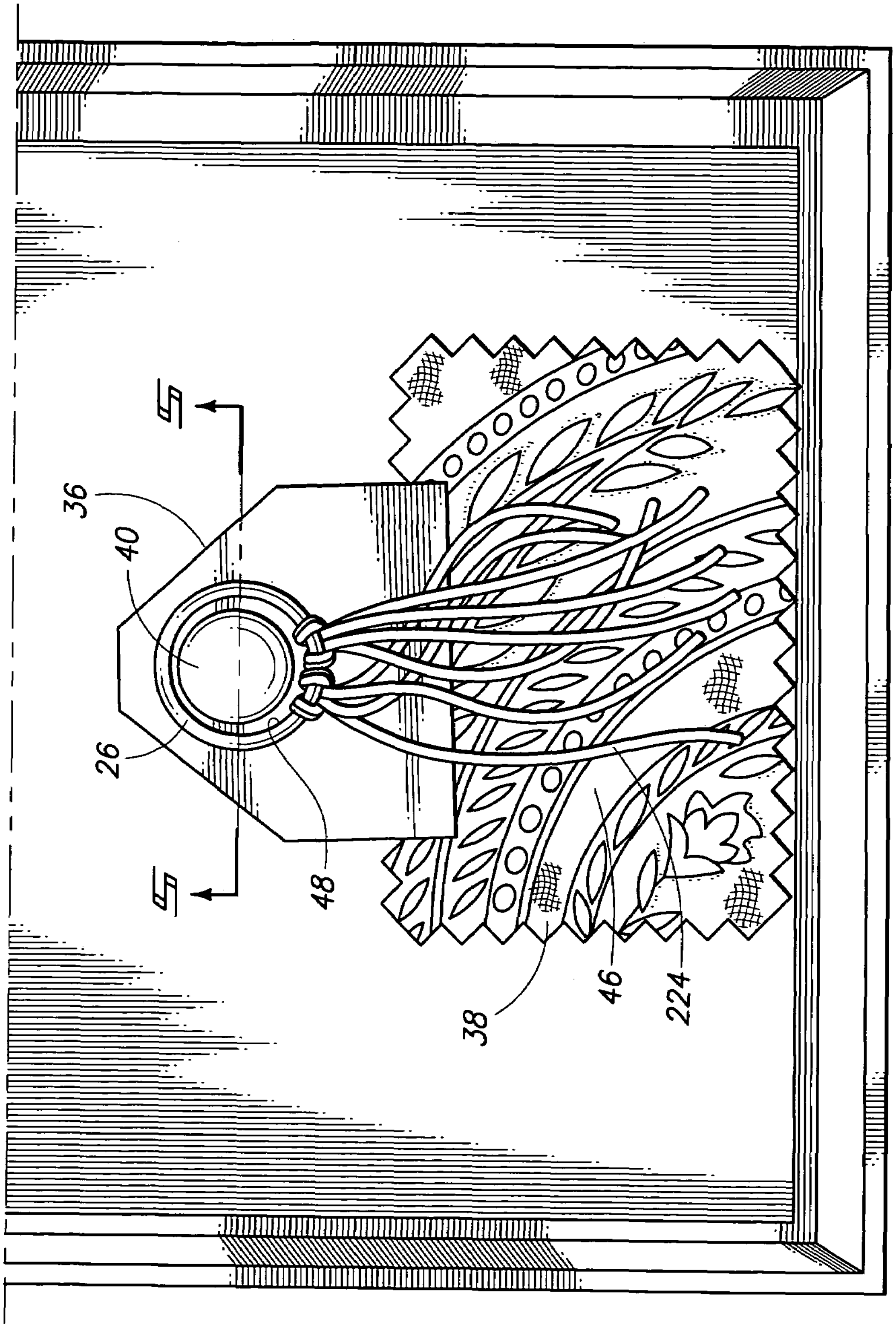
FIG. 4 is a further enlarged partial perspective view taken from above the folio of FIG. 3.

FIG. 4 illustrates in further enlarged detail the placement of a selected cloth swatch 38 via a cloth carrier 36 about magnetic stud 40. Olive green colored fiber 224 on ring carrier 26 is then pivotally manipulated about stud 40 for positioning adjacent or atop color element 46 of cloth swatch 38. Color element 46 has a similar olive green colored configuration. A designer can then attempt to visually align fiber 224 with color element 46 in order to identify whether a complementary match has been provided for an aesthetic design.

Also as shown in FIG. 4, ring carrier 26 comprises a nickel (or chrome) plated steel ring having an inner aperture (or hole) 48. Ring 26 is sized with an inner aperture 48 that is slightly larger than a maximum outer diameter of stud 40 in order to provide sufficient room to tie or twist fibers 224 onto portions of ring 26. By mounting ring carrier 26 atop fiber carrier 36, ring 26 is magnetically attracted and retained atop stud 40 which also retains fiber carrier 36 and fiber swatch 38 about stud 40. Alternatively, carrier 36 can be constructed from an elastomeric material, such as synthetic rubber, with an aperture sized to form an interference fit with the enlarged head of a stud. In this case, carrier 36 is self-retained on stud 40.

FIG. 5 illustrates one construction for fabric carrier 36. Fabric carrier 36 includes a shelf 73 that extends beneath fabric swatch 38 to help support fabric swatch 38 for visual presentation to a user who is holding fabric carrier 36 to view fabric swatch 38 prior to mating carrier 36 with a selected stud. Additionally, shelf 73 helps facilitate opening of fabric carrier 36 when inserting and removing a fabric swatch 38.

FIG. 6 illustrates the manner in which fabric carrier 36 magnetically affixes a fabric swatch 38 between a magnet (sheet of magnetic material) 76 and a magnetizable metal sheet 78. More particularly, carrier 36 includes a bi-fold body having a top member 70 and a bottom member 72 that are connected by a hinge 74. When folded together, top member 70 and bottom member 72 trap fabric swatch 38 by magnetic attraction of magnet 76 with metal sheet (steel) 78.

As shown, top member 70 and bottom member 72 are not identical mirror images, as bottom member 72 is slightly longer than top member 70 which provides for shelf 73. However, remaining portions of top member 70 and bottom member 72 are essentially mirror images of one another. For example, aperture 50 extends through both top member 70 and bottom member 72 in compatible alignment when folded about hinge 74.

In operation, different fabric swatches 38 can be assembled into fabric carrier 36 by merely pulling apart top member 70 and bottom member 72 pivotally about hinge 74. Accordingly, different fabric swatches can be loaded and unloaded into fabric carrier 36.

In operation, when fabric carrier 36 is closed and loaded with a fabric sample 38, magnet 76 is attracted to metal sheet 78. Such attraction provides further magnetic attraction onto a base, such as onto magnetic sheet 44 (see FIG. 7). Furthermore, magnet 76 also provides retention of carrier 36 onto a magnetized stud by interacting with magnet 52 (see FIG. 7) to prevent dislodgement of carrier 36 and fabric swatch 38 from around such a stud. According to one construction, magnetic sheet 76 is constructed from the same material used to construct retainer 22, base 44, and background 42 (see Fix. 2).

Figure 7:
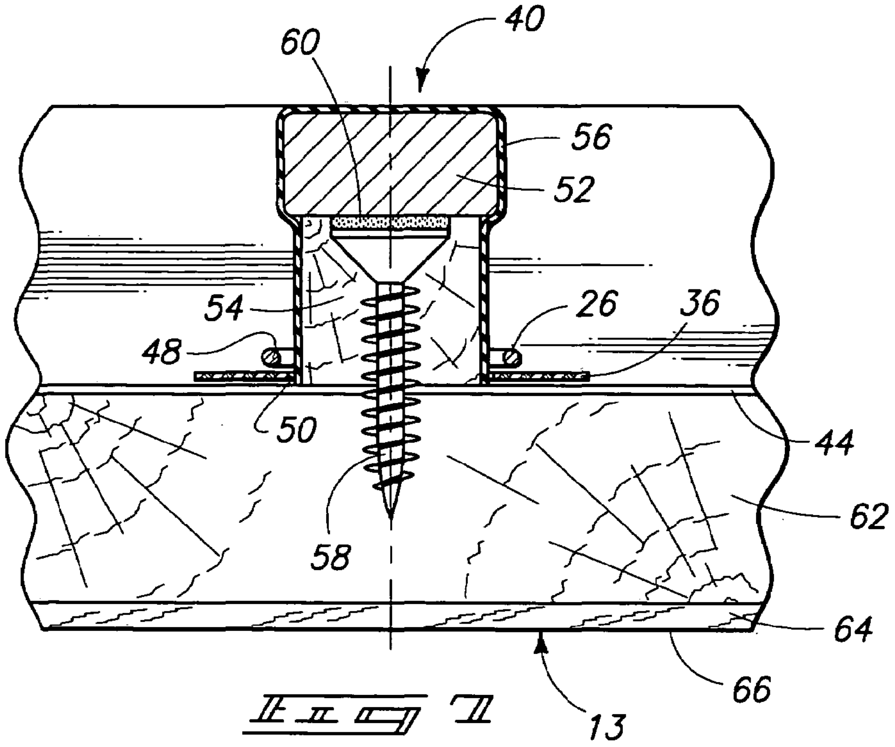
FIG. 7 is a vertical sectional view taken along line 5—5 of FIG. 4 and illustrating construction of a magnetic post.

FIG. 7 illustrates in enlarged cross-sectional view the construction of display stud 40 in FIG. 4. It is understood that magnetic studs 28–32 (see FIGS. 2–3) are constructed in a similar manner to stud 40, as shown in FIG. 7. More particularly, magnetic (or magnetized) stud 40 includes a permanent magnet 52, such as a rare earth magnet. Magnet 52 is adhesively affixed via a polyurethane or epoxy adhesive 60 along a cylindrical post, such as a wood dower, 54. Dowel 54 is pre-drilled with a central through-hole (which is coated with adhesive) and a recess in order to receive a wood screw 58 therethrough. Screw 58 is recessed sufficiently to leave a gap into which a polyurethane or epoxy adhesive 60 is then delivered, after which magnet 52 is seated there atop for securement thereabove. Subsequent to curing of epoxy adhesive 60, magnet 52 and post 54 are dipped into a liquid latex or rubber coating in order to provide a dried rubber coating 56 thereabout to prevent scratching of the white powder-coated surface of metal sheet 20. After drying or curing of the rubber coating, magnetic stud 40 is then threaded into engagement via fastener 58 within a hole (with epoxy adhesive) that is provided through magnetic base 44 and into a plywood support base 62. Base 62 is adhesively bonded onto an inner surface of back cover 13. According to one construction, plywood support base 62 is a ⅜" thick sheet of plywood sized to fit within an inner wall dimension of 9⅛" in height by 5⅞" in width of walled portion 16 (see FIG. 2).

As shown in FIG. 7, back cover 13 is formed from a sheet of chipboard material 64 over which a cloth covering 66 is later affixed. Similarly, walled portion 16 (see FIG. 2) is also formed from chipboard material about which a paper covering is subsequently adhesively affixed thereabout. Alternatively, walled portion 16 (of FIG. 2) and board 64 of back cover 13 can be formed from particle board, plywood, plastic, fiberglass, cardboard, or any other fairly rigid sheet material. In one case, the sidewalls of walled portion 16 can be dovetailed and glued together.

According to one construction, cloth covering 66 comprises Kivar®, a federally registered trademark of Fibermark DSI, of South Hadley, Mass. Kivar® is a commercially available cloth covering for binding books and folios. Several versions are available and are suitable for use herein, including Kivar® 7 and Kivar® 2. It is envisioned that alternative cloth materials, as well as vinyl surfaces, can also be utilized, as well as any suitable covering material.

As shown in FIG. 7, fabric carrier 36 is shown received about magnetic stud 40 via a respective aperture (or hole) 50. Metal ring carrier 26 is then received atop fabric carrier 36 by way of aperture 48 which also clears over stud 40. Magnetic attraction between the steel of metal ring carrier 26 and magnet 56 prevents dislodgment of ring carrier 26 and fabric carrier 36 from stud 40. Ring carrier 26 and fabric carrier 36 can also be magnetically attracted to the magnetic sheet that forms the top surface of base 44.

Figure 8:
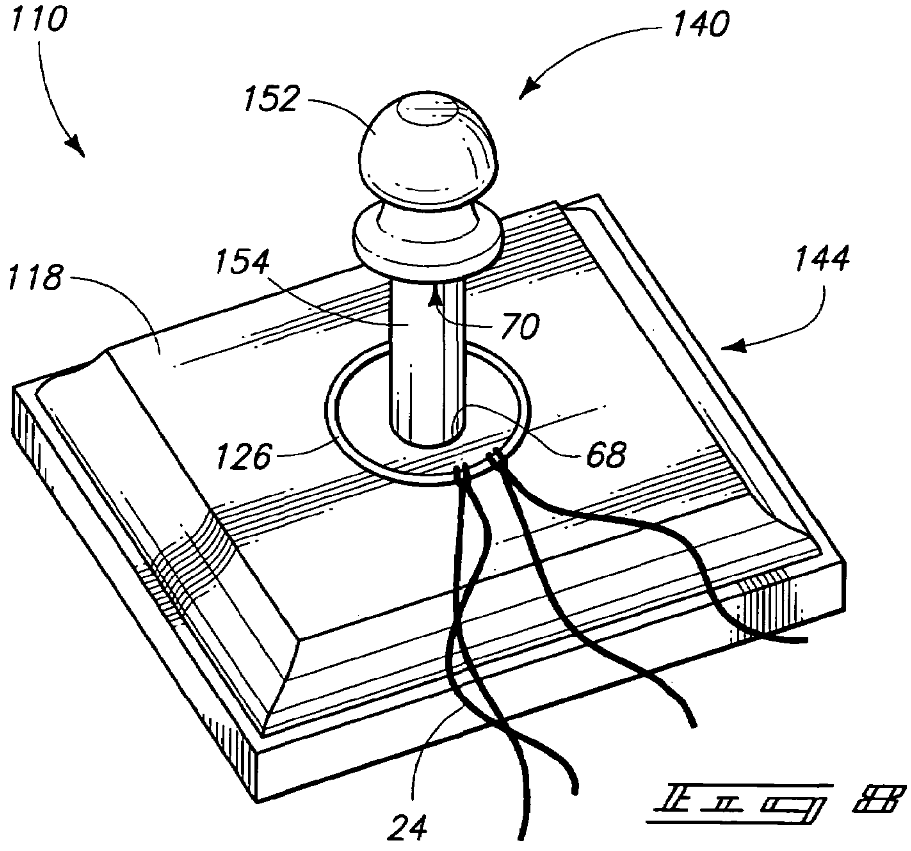
FIG. 8 is a perspective view of an alternatively constructed aesthetic component comparison system according to another aspect of the present invention.

FIG. 8 illustrates an alternative construction for a decorative design tool comprising an aesthetic component comparison system 110 that is formed from a rectangular wooden base 144 into which a cylindrical bore 68 is provided and sized to removably receive a cylindrical wooden dowel 158. A removable retainer cap 152 has a similarly sized cylindrical bore 70 which facilitates mating and demating of retainer cap 152 from a topmost portion of dowel 154. Dowel 154, when mounted to base 144, is operative to provide a display stud about which individual fibers or yarns 24 can be manipulated and carried via a ring 126. Multiple rings 126 with multiple fibers 24 can be mounted to and demounted from post 154 to facilitate pivotal and rotational positioning of selected fibers for comparison in determining whether selected fibers complement one another in relation to a specific design that is being considered.

According to one construction, base 144 comprises a wooden block having beveled edges and a top surface that forms a work area 118. However, base 144 can be formed from alternative materials such as plastic, foam, or any other solid material.

Although the previous two embodiments teach the present invention when comparing aesthetic components in the form of fibers, fabric, beads and medallions, it is envisioned that the present invention can be used to compare any of a number of materials, including samples of Formica®, natural stone, paint chips, wall borders, wallpaper, wood samples for flooring, and samples for window blinds. By providing an aperture within the sample, or by mounting the sample onto a carrier having an aperture, individual or multiple aesthetic components can be compared over a work area using the apparatus and method of the present invention.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A portable aesthetic component comparison system, comprising:

a folio;

a support base provided in the folio;

a work surface provided on the support base;

a post supported along a proximal end by the support base centrally of the work surface with a distal end of the post spaced form the work surface; and a plurality of carriers each configured to support at least one aesthetic component, each carrier having an aperture configured to be received over the post for pivotal positioning of one aesthetic component relative to another aesthetic component atop the work surface;

wherein the post is supported at a proximal end by the support base and a magnet is provided at a distal end of the post, and wherein at least one of the carriers comprises a ring of magnetizable material capable of being magnetically attracted to the magnet.

2. The comparison system of claim 1 wherein one aesthetic component comprises a woven fabric, and another aesthetic component comprises at least one thread specimen.

3. The comparison system of claim 2 wherein at least one of the carriers comprises a ring of magnetizable material, and a plurality of different thread samples are provided on the ring to enable radial positioning of one thread relative to the other threads about the ring to facilitate placement of the one thread over the one aesthetic component comprising a woven fabric to compare color conformity between the selected thread sample and the woven fabric.

4. The comparison system of claim 2 wherein the carrier for the woven fabric comprises a cardboard carrier having an aperture configured to be received over the post, and the woven fabric is affixed onto the cardboard carrier.

5. A portable aesthetic component comparison system, comprising:

a folio having a mating and demating cover and a rectangular configuration of four sides affixed to, adjoining, and encircling the bottom of the folio;

a support base provided in the folio by a bottom inner surface of the folio;

a work surface provided on the support base;

a post supported along a proximal end by the support base centrally of the work surface with a distal end of the post spaced form the work surface: and a plurality of carriers each configured to support at least one aesthetic component, each carrier having an aperture configured to be received over the post for pivotal positioning of one aesthetic component relative to another aesthetic component atop the work surface;

wherein an inner surface of the cover comprises one of a magnetizable material and a magnetic material and a distal end of the post comprises another of a magnetic material and a magnetizable material configured to magnetically interact with the inner surface of the cover to secure the cover in a closed position against the sides of the folio.

6. A portable aesthetic component comparison system, comprising:

a folio;

a support base provided in the folio;

a work surface provided on the support base;

a post supported alone a proximal end by the support base centrally of the work surface with a distal end of the post spaced form the work surface; and a plurality of carriers each configured to support at least one aesthetic component, each carrier having an aperture configured to be received over the post for pivotal positioning of one aesthetic component relative to another aesthetic component atop the work surface wherein the work surface is provided by a display background comprising a magnetic sheet of material and the support base comprises at least one of a magnetic material and a magnetizable material capable of magnetically attracting the magnetic sheet to affix the magnetic sheet atop the support base.

7. The comparison system of claim 6 wherein the display background includes an aperture configured to receive the work surface about the post.

8. The comparison system of claim 6 wherein the display background has a first side with a first color and a second side with a second color, and wherein the display background is reversible so asto affix either the first side or the second side onto the support base.

9. The comparison system of claim 8 wherein the first side comprises a black surface and the second side comprises a white surface.

10. A decorator design tool, comprising:

a base providing a work surface comprising a sheet of magnetic material affixed atop the in base; and a post having a proximal end supported by the base centrally of the work surface and a distal end spaced from the work surface;

wherein the post is configured to receive a plurality of aesthetic components each supported via a carrier with a hole configured to be received over the distal end of the post for pivotal positioning of one aesthetic component relative to another aesthetic component atop the work surface.

11. A portable aesthetic component comparison system, comprising:

a folio;

a support base provided in the folio;

a work surface provided on the support base;

a post comprising a stud having a magnetized portion comprising a magnet affixed atop a cylindrical base portion, the post supported along a proximal end by the support base centrally of the work surface with a distal end of the post spaced form the work surface; and a plurality of carriers each configured to support at least one aesthetic component, each carrier having an aperture configured to be received over the post for pivotal positioning of one aesthetic component relative to another aesthetic component atop the work surface;

wherein a rubber coating is applied to the stud.

12. The comparison system of claim 11 further comprising a plurality of aesthetic components each supported via a carrier with a hole configured to be received over the post for pivotal positioning of one aesthetic component relative to another aesthetic component atop the work surface.

13. A stud for retaining and manipulating design components when rendering aesthetic design decisions, comprising:

a base; and a post affixed to the base with a fastener along a proximal end and having a magnet provided along a distal end of the post and configured to facilitate retention of design components via a magnetizable carrier about the post;

wherein the base includes a magnetic sheet of material affixed atop the support structure and further comprising a display background formed of magnetic material for magnetic affixation onto the magnetic sheet of the base and having different colors on opposite faces of the display background, the display background having a central aperture configured to be received over the post, wherein the display background can be reversibly mounted atop the base to change the color of the display background relative to the post.

14. The stud of claim of claim 13 wherein the post comprises a cylindrical dowel and an earth magnet adhesively affixed atop the cylindrical dowel.

15. The stud of claim 14 wherein the earth magnet has a slightly larger diameter than the cylindrical dowel.

16. A stud for retaining and manipulating design components when rendering aesthetic design decisions, comprising:

a base;

a post comprising a cylindrical dowel and an earth magnet adhesively affixed atop the cylindrical dowel, the earth magnet having a slightly larger diameter than the cylindrical dowel, and the post affixed to the base along a proximal end and having a magnet provided alone a distal end of the post and configured to facilitate retention of design components via a magnetizable carrier about the post; and a rubber covering provided over the post.

* * * * *

UNITED STATES PATENT AND TRADEMARK OFFICE

CERTIFICATE OF CORRECTION

PATENT NO. : 7,226,290 B2 
APPLICATION NO. : 10/841315
DATED : June 5, 2007
INVENTOR(S) : Mary Nickol It is certified that error appears in the above-identified patent and that said Letters Patent is hereby corrected as shown below:

Col. 3, line 54, replace “included within’the scope” with --included within the scope--

Col. 5, line 1, replace “a hole that-is” with --a hole that is--

Col. 10, line 4, replace “post spaced form the work” with --post spaced from the work--

Col. 10, line 40, replace “post spaced form the work” with --post spaced from the work--

Col. 10, line 58, replace “a post supported alone a” with --a post supported along a--

Col. 10, line 60, replace “post spaced form the work” with --post spaced from the work--

Col. 11, line 11, replace “reversible so asto affix” with --reversible so as to affix--

Col. 11, line 18, replace “affixed atop the in base” with --affixed atop the base--

Col. 11, line 37, replace “post spaced form the work” with --post spaced from the work--

Col. 12, line 24, replace “The stud of claim of claim” with --The stud of claim--

Col. 12, line 37, replace “magnet provided alone a” with --magnet provided along a--

Signed and Sealed this

Sixteenth Day of December, 2008

JON W. DUDAS
*Director of the United States Patent and Trademark Office*